Jan. 9, 1945.  H. W. SHAVER  2,367,144
INJECTION MOLDING MACHINE
Filed Jan. 30, 1942  5 Sheets-Sheet 1
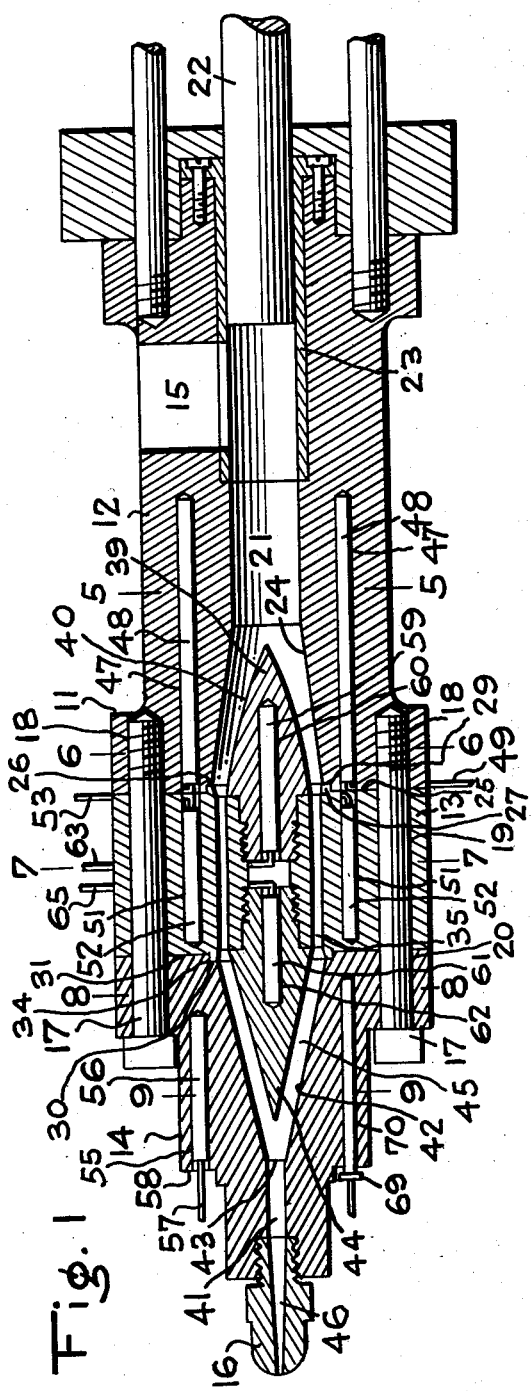
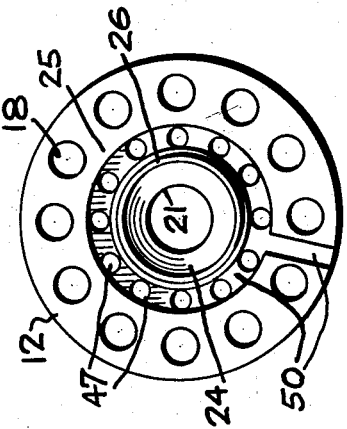
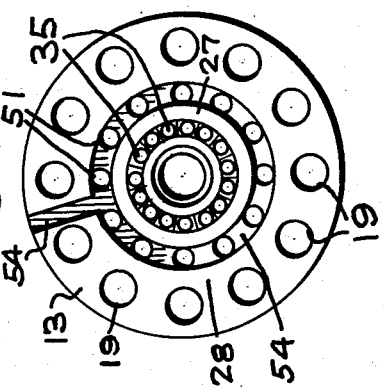
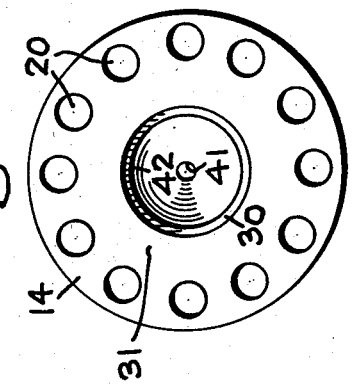
Inventor
H. W. SHAVER
By
Malcolm F. Gannon
Attorney

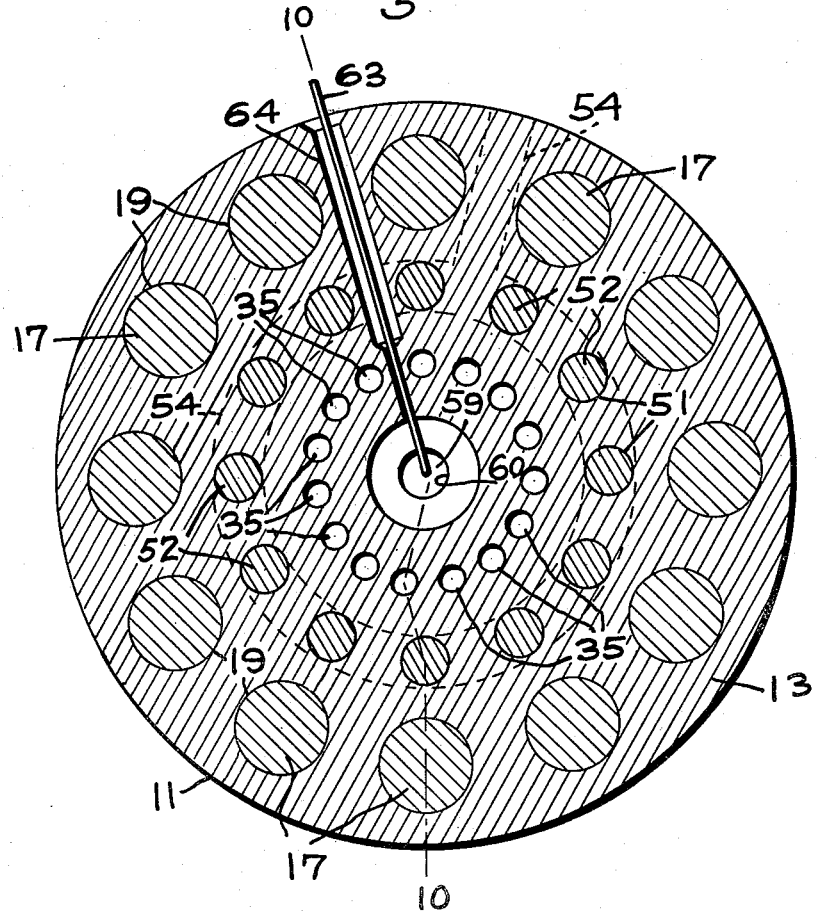

Jan. 9, 1945.   H. W. SHAVER   2,367,144
INJECTION MOLDING MACHINE
Filed Jan. 30, 1942   5 Sheets-Sheet 4
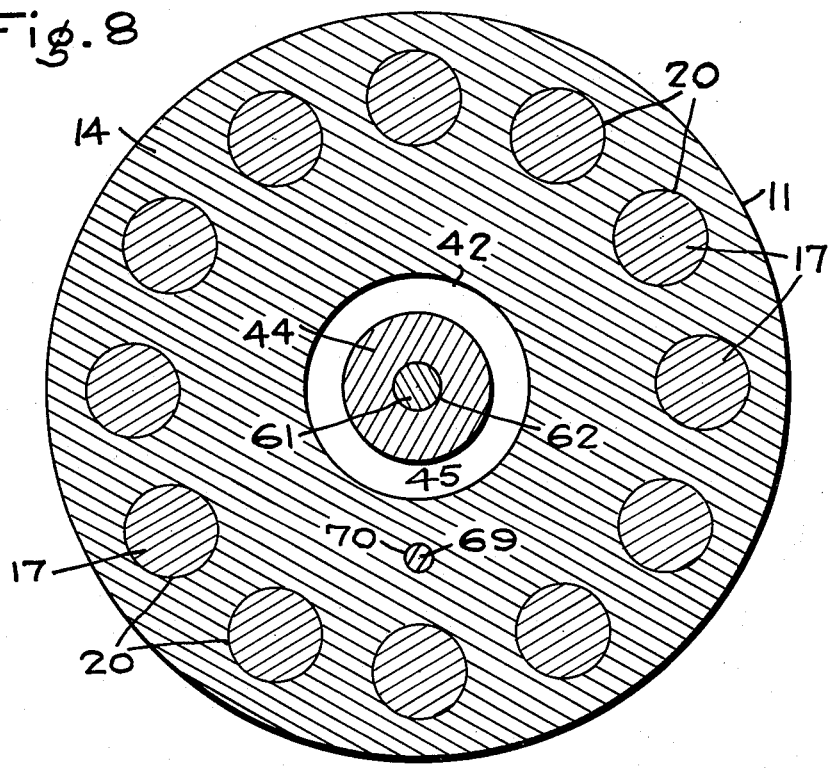
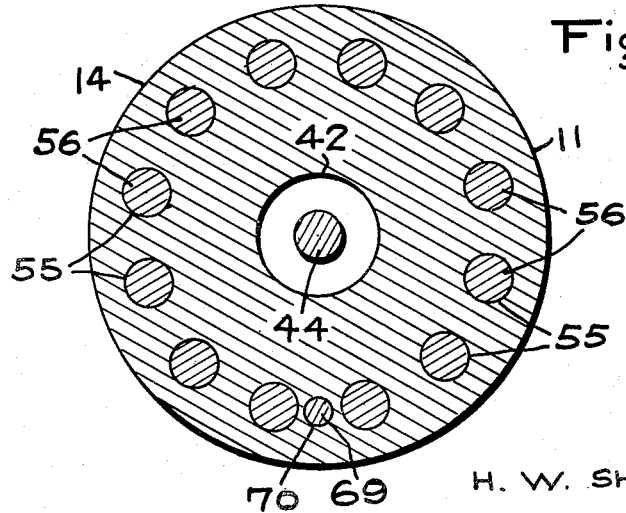
Inventor
H. W. SHAVER
Attorney

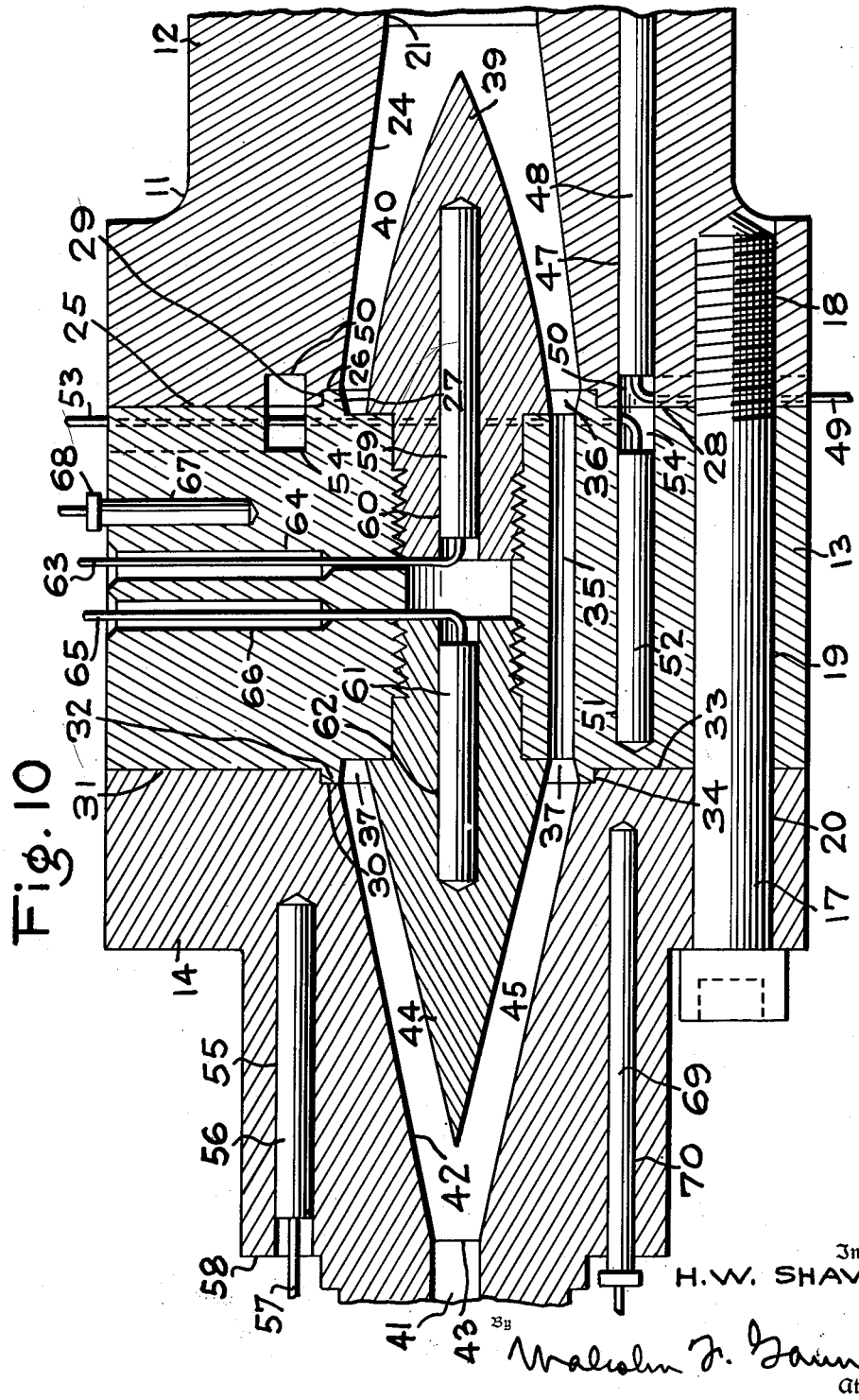

Patented Jan. 9, 1945

2,367,144

UNITED STATES PATENT OFFICE 2,367,144

INJECTION MOLDING MACHINE

Herbert W. Shaver, New Freedom, Pa., assignor to American Insulator Corporation, New Freedom, Pa., a corporation of Delaware Application January 30, 1942, Serial No. 428,861

2 Claims. (Cl. 18—30)

This invention relates to improvements in an injection device for charging a mold with a moldable material.

Moldable materials such as wax, Celluloid, cellulose acetate, phenol-condensate products in general, and various other such materials are usually supplied to the manufacturer in granular form, such as dry powder or pellets. In manufacturing molded articles the material is heated to a plastic condition in a passage or conduit and forced under high pressure through an orifice into a mold cavity. The material is inherently a poor conductor of heat, being therefore difficult to heat uniformly, and it is likely to become burnt or discolored if overheated. The problem of uniformly heating a mass of this material under very high pressure and maintaining it always within the required range of temperature presents great practical difficulties.

An object of the invention is to provide an improved injection molding device designed to perform its work with maximum efficiency.

Another object of the invention is to provide an improved injection molding device in which provision is made for improved distribution of heat through a charge of the moldable material in order to quickly bring the entire charge to a required plastic condition.

Another object of the invention is to provide an improved injection molding device adapted to increase the rate of injection and at the same time produce a molded product of good quality.

Another object of the invention is to provide an improved injection molding device having improved heating means adapted to be controlled and regulated at several different points.

Another object of the invention is to provide an improved injection molding device having means for accurately controlling the degree of heat supplied to the charge.

Another object of the invention is to provide an improved injection molding device in which resistance heating elements are arranged in close proximity with the conduit through which the molding material is delivered.

Another object of the invention is to provide an improved injection molding device having a pressure cylinder formed intermediate the length thereof with an annular series of longitudinally disposed conduits, and having an annular series of longitudinally disposed heating elements mounted within the body of the cylinder and surrounding the conduits.

Another object of the invention is to provide an improved pressure cylinder for an injection molding device for moldable materials, in which the cylinder is formed of a heavy body having a plurality of conduits arranged longitudinally therein through which the molding material is adapted to be forced under pressure, the conduits being arranged annularly with respect to the longitudinal center line of the cylinder, and in which a plurality of longitudinally disposed heating elements are mounted in the body of the cylinder, some of the heating elements being arranged along the longitudinal center line of the cylinder and other heating elements being arranged in a circle and surrounding the conduits.

With these and other objects in view the invention consists of the construction and arrangement of the parts to be hereinafter more fully described and claimed.

In the accompanying drawings:

Fig. 1 is a longitudinal section through the injecting mechanism in which the molding material is heated preparatory to injection into the mold;

Fig. 2 is a view of one end of the charging section of the device;

Fig. 3 is a view of the end of the intermediate section of the device which abuts the end shown in Fig. 2;

Fig. 4 is a view of the end of the discharge section of the device which abuts the face of the intermediate section opposite to the end shown in Fig. 3;

Fig. 7 is a vertical transverse section taken on the line 7—7 of Fig. 1;

Fig. 8 is a vertical transverse section taken on the line 8—8 of Fig. 1;

Fig. 9 is a vertical transverse section taken on the line 9—9 of Fig. 1; and

Fig. 10 is a longitudinal section taken on the line 10—10 of Fig. 7.

Figure 5:
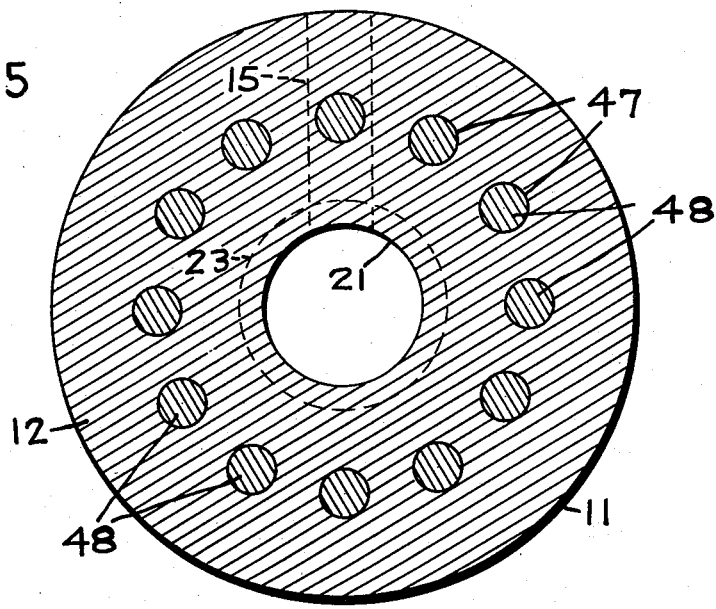
Fig. 5 is a vertical transverse section taken on the line 5—5 of Fig. 1.

In order to be formed into molded articles the molding material is heated in a cylinder terminating in a nozzle and by means of a piston is subjected to a high pressure due to which that part of the material which is near the nozzle and which has become sufficiently fluid is injected into the mold. After the piston has maintained the pressure for a certain time it is withdrawn.

Thus during the injection operation the piston must move in the forward direction the material which is in the cylinder and which is still quite cold at the inlet end. The more or less cold material which is compressed under high pressure opposes a considerable frictional resistance to the forward movement and, to overcome this resistance, it is necessary to employ many times the force requisite for the actual operation of filling the mold. In addition it has been found to be difficult to heat the material uniformly to the required temperature in the heating and pressure cylinder because on the one hand such molding materials have a small thermal conductivity and on the other hand they are readily damaged by excessive heating. Consequently it has been frequently necessary to wait a considerable period before the injection operation in order to give the material time to heat up sufficiently so that the economy of operating injection molding machines was considerably reduced.

According to the present invention the above-mentioned disadvantages are avoided by constructing the pressure cylinder so that the large mass of material delivered to the cylinder is divided into a multiplicity of small elongated bodies adapted to be completely heated to the injection temperature in the shortest possible time and with a minimum of difficulty.

Referring to the drawings, the improved injection molding device comprises a material or pressure cylinder, generally indicated by the numeral 11. For convenience of manufacture the cylinder 11 may be formed of three sections designated by the reference numerals 12, 13 and 14.

The section 12 of the device will, for convenience, be sometimes referred to as the charging section or the preheating section, since said section 12 is formed with an opening 15 through which the molding material is introduced to the cylinder from a reservoir or source of supply, such as a hopper, not shown.

The section 13 will be referred to as the intermediate section, since said section is interposed between the sections 12 and 14.

The section 14 will be referred to as the discharge section, since said section has an outlet nozzle 16 of well known form projecting therefrom.

The sections 12, 13 and 14 of the pressure cylinder 11 are secured together, so as to provide a unitary structure, and in order that said sections will be rigidly and firmly held together, an annular series of socket-head screws 17 are employed.

The sections 12, 13 and 14 are formed with alined openings 18, 19 and 20, respectively, which openings are located in said sections near the outer periphery thereof, as shown in Figs. 2, 3 and 4.

The openings 18 of the section 12 are threaded for the reception of the threaded end of the screws 17.

The openings 19 and 20 are bored to snugly receive the shanks of the screws 17.

The screws 17 are spaced fairly close together so as to prevent separation of the several sections of the cylinder during operation of the device.

The section 12 is formed with a bore 21 which is disposed along the longitudinal center line thereof. The bore 21 constitutes a conduit or passage through which the molding material moves from the inlet opening 15 towards the outlet nozzle 16. The bore 21 is cylindrical for a portion of its length to provide means for guiding a piston or plunger 22. The piston or plunger 22 is adapted to be operated in well known manner by a power cylinder or servo motor (not shown).

A bushing 23 is mounted in the section 12 in the portion of the bore 21 in which the piston 22 operates.

As shown in Fig. 1, the charging opening 15 is located directly in advance of the rearmost position of the piston 22.

The portion of the conduit 21 beyond the portion thereof in which the piston 22 operates is flared outwardly, or formed with a tapered wall, indicated at 24, so that, at the end face 25 of the section 12, the diameter of the conduit 21 is considerably larger than the diameter of the portion of said conduit in which the piston 22 operates (see Fig. 2). It will thus be noted that the portion 24 of the conduit is of conical form, having a gradually increasing diameter.

The central portion of the face 25 of the section 12 is formed with an annular recess 26 for receiving an annular extended portion or boss 27 formed concentrically on the face 28 of the section 13. This construction provides a step-joint or shoulder 29 at the joint between the two sections 12 and 13.

Annular recess 30 is also formed concentrically in the face 31 of the section 14 for receiving an annular extended portion or boss 32 formed concentrically on the face 33 of the section 13. This construction provides a step-joint or shoulder 34 between the sections 13 and 14.

It will be understood that the shoulders 29 and 34 prevent lateral slippage of the three sections relative to each other, as well as providing means for better sealing the joints between said sections.

The intermediate section 13 of the pressure cylinder 11 is formed with a plurality of openings 35. These openings are disposed concentric with the longitudinal center line of the pressure cylinder and are arranged in a circle, being spaced fairly close together and being of relatively small diameter.

The openings 35 constitute tubes, passages, or conduits through which the molding material is adapted to be forced during operation of the device, and in order to permit the molding material to pass into and out of the openings 35, the inlet and outlet ends 36 and 37 thereof, are, respectively, flared, as indicated in Fig. 10.

The diameter of the end of the tapered wall 24 of the conduit 21 which abuts the end face 28 of the intermediate section 13 is such that the conduit 21 at the end of the wall 24 encloses or surrounds the annular series of longitudinally disposed conduits 35.

In order to provide means for directing the molding material in the conduit 21 towards the series of passages or conduits 35, a deflector 39 is mounted concentrically on the end face 28 of the intermediate section 13.

The deflector 39 is of conical form, having an elongated body which extends from the face 28 towards the piston 22 for a suitable distance and which terminates at its outer end in a point.

Figure 6:
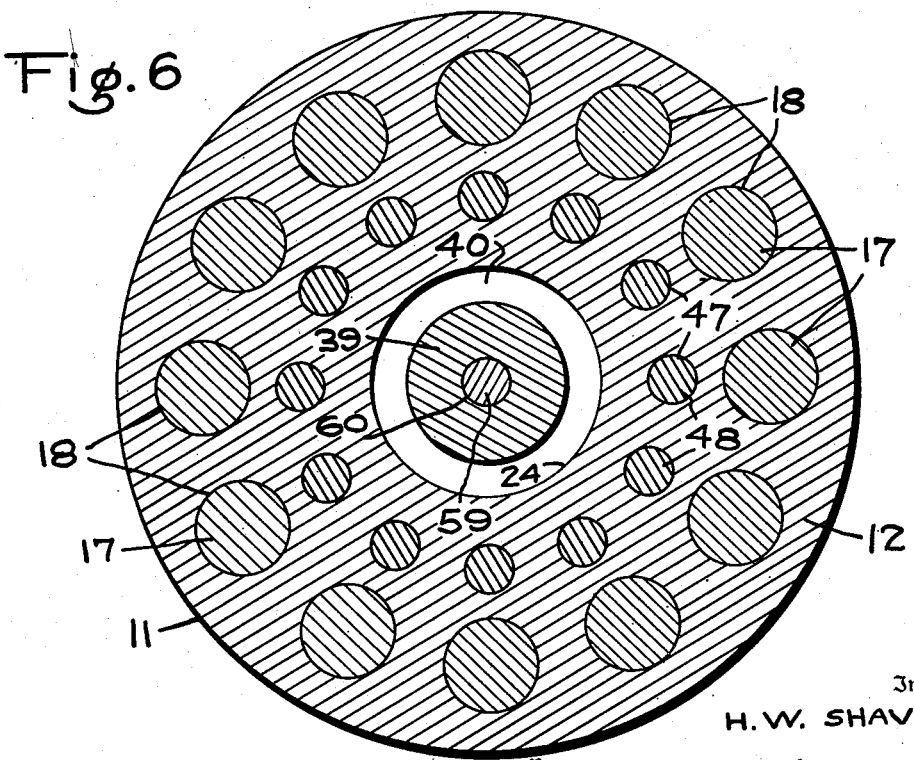
Fig. 6 is a vertical transverse section taken on the line 6—6 of Fig. 1.

The contour or configuration of the deflector 39 is such that an annular passage 40 of gradually decreasing area in cross section, is formed in the conduit 21 (see Figs. 6 and 10), and in this passage the molding material is adapted to become plastic as it is forced by the piston 22 into the annular series of longitudinally disposed conduits 35.

The discharge end section 14 of the pressure cylinder 11 has a conduit 41 formed coaxially thereof, said conduit having a portion with a tapered wall 42 which extends from the end face 31 and gradually converges towards the point, indicated at 43, where it merges with the cylindrical portion of the conduit, indicated by the numeral 41.

The end of the portion 42 of the conduit 41 at the joint between the sections 13 and 14 has a diameter corresponding substantially with the diameter of the end of the portion 24 of the conduit 21, said end portion of the conduit 42 being adapted to surround or encircle the mouths 37 of the conduits 35, as shown in Fig. 10.

In order to provide means for directing the molding material discharged from the mouths 37 towards the conduit 41, which latter conduit has an area considerably smaller than the cross sectional area of the conduit 21, a deflector 44 is mounted concentrically on the end face 33 of the section 13.

The deflector 44 is of conical form, having an elongated body which extends from the mouths of the conduits 35 towards the point 43 of the conduit 41.

The deflector 44 provides an annular passage 45 (see Fig. 9) through which the several streams of molding material discharged from the conduits 35 are conducted towards the discharge conduit 41 where they merge into a single mass of material that passes through the opening 46 of the nozzle 16 into the mold in well known manner.

In order that the body of the pressure cylinder 11 may be heated to the desired degree of temperature, a multiplicity of heating elements are mounted in the body of the cylinder.

Formed in the section 12 is an annular series of longitudinally disposed openings 47, in each of which there is mounted an electrical heating element 48, having a conductor 49 leading therefrom and passing outwardly through a groove or channel 50.

Likewise, the section 13 is formed with an annular series of longitudinally disposed openings 51, in each of which there is mounted an electrical heating element 52, having a conductor 53 leading therefrom and passing outwardly through a groove or channel 54.

Also, formed in the section 14, is an annular series of longitudinally disposed openings 55, in each of which there is mounted an electrical heating element 56, having a conductor 57 leading therefrom. The openings 55 extend inwardly of the section 14 from an end wall 58 thereof.

On the other hand, the heating elements 48 and 52 are entirely enclosed by the body of the pressure cylinder.

As shown in Figs. 5, 6, 7 and 9, the electrical heating elements 48, 52 and 56 are arranged concentrically around the conduit of the pressure cylinder through which the molding material passes, said heating elements being spaced fairly close together and being so disposed as to heat the body of the pressure cylinder so that the molding material will have the desired temperature.

In order to introduce heat to the central portion of the pressure cylinder, an electrical heating element 59 is mounted in a bore 60 formed along the longitudinal center line of the deflector 39, and another electrical heating element 61 is mounted in a bore 62 formed along the longitudinal center line of the deflector 44.

Leading from the electrical heating element 59, is a conductor 63 which passes outwardly of the pressure cylinder through a passage 64 formed radially in the section 13 and located between two of the openings 51, as shown in Fig. 7.

A conductor 65 likewise leads from the electrical heating element 61 and extends through a passage 66 formed in the section 13 to the exterior of the pressure cylinder, as shown in Fig. 10.

In order that the temperature of the body of the pressure cylinder may be determined, a bore 67 is formed in the section 13 for a suitable thermometer or temperature recording instrument 68. Also a second thermometer or temperature recording instrument 69 is mounted in a longitudinally disposed bore 70 formed in the section 14.

Since the pressure cylinder 11 comprises a body formed of the three sections 12, 13 and 14, the section 12 having the conduit 21, 24 formed therein, the section 13 having the annular series of longitudinally disposed conduits 35 formed therein, and the section 14 having the conduit 41, 42 formed therein, the heating elements 48 which surround the conduit 21, 24 are adapted to heat this portion of the cylinder 11 so as to preheat the molding material, the heating elements 52, 59 and 61 are adapted to heat the intermediate portion of the cylinder 11 so that the preheated molding material becomes plastic or fluid, and the heating elements 56 and 62 are adapted to heat the discharge end portion of the cylinder sufficiently to maintain the molding material in the desired plastic condition without overheating the same.

It will be noted that since each heating element is connected to a conductor, the several conductors may be connected to a source of electric energy in such a manner that the amount of heat produced by each heating element can be individually controlled. In this way the heating means for the device may be controlled and regulated at several different points, thereby permitting the heat to be distributed through the device to the molding material in such a manner as to maintain the material in the required plastic condition.

It will also be understood that the term "heating element" as used herein refers to any type of heating means or heating medium which are applicable for installation in the cylinder 11.

From the foregoing it will be noted that the present invention provides an improved injection molding machine, and in which the molding material will be heated to a plastic condition in a conduit so constructed and arranged with respect to the heating elements that the material will be uniformly heated and maintained at the desired temperature for injection into the mold.

Having thus fully described the invention, what is claimed is:

1. In combination, a pressure casting machine having a pressure cylinder comprising three sections arranged in end to end relationship and including a charging section, an intermediate section, and a discharge section, said intermediate section having a longitudinal threaded bore formed along the longitudinal center line thereof, said bore extending throughout the entire length of said intermediate section, a deflector having a reduced threaded end mounted in one end of the threaded bore of said intermediate section and extending into said charging section, a second deflector having a reduced threaded end mounted in the other end of the threaded bore of said intermediate section and extending into said discharge section, the inner ends of both said deflectors being disposed within the bore of said intermediate section in spaced relation to each other to form a central chamber within said intermediate section, a heat chamber formed longitudinally in each deflector and arranged along the longitudinal center line thereof, the inner end of each heat deflector chamber communicating with said central chamber within said intermediate section, and means for introducing heat through said intermediate section to said central chamber and from thnce to each of said deflector heat chambers.

2. An injection molding machine comprising a pressure cylinder formed of three sections arranged in end to end relationship and including a charging section having a chamber formed concentric to the longitudinal center line thereof, an intermediate section having a longitudinal threaded bore formed along the longitudinal center line thereof, said bore extending throughout the entire length of said intermediate section, and a discharge section having a chamber formed concentric to the longitudinal center line thereof, a conical deflector having a reduced threaded end at its base mounted in one end of the threaded bore of said intermediate section and extending into the chamber of said charging section, a second conical deflector having a reduced threaded end at its base mounted in the other end of the threaded bore of said intermediate section and extending into the chamber of said discharge section, the inner ends of said deflectors being spaced apart to provide a chamber centrally of said intermediate section, a heating means arranged longitudinally in each deflector, and means for introducing heat through said intermediate section to its central chamber and from thence to each said deflector heating means.

HERBERT W. SHAVER.